(12) United States Patent
Habetha

(10) Patent No.: US 7,171,169 B2
(45) Date of Patent: Jan. 30, 2007

(54) NETWORK WITH ADAPTATION OF THE MODULATION METHOD

(75) Inventor: Joerg Habetha, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 566 days.

(21) Appl. No.: 10/257,204

(22) PCT Filed: Feb. 13, 2002

(86) PCT No.: PCT/IB02/00433

§ 371 (c)(1),
(2), (4) Date: Oct. 9, 2002

(87) PCT Pub. No.: WO02/067492

PCT Pub. Date: Aug. 29, 2002

(65) Prior Publication Data

US 2003/0125066 A1 Jul. 3, 2003

(30) Foreign Application Priority Data

Feb. 16, 2001 (DE) ................. 101 07 850

(51) Int. Cl.
*H04B 1/02* (2006.01)
*H04B 1/66* (2006.01)

(52) U.S. Cl. .............. 455/102; 455/69; 455/67.11; 455/67.13; 455/522; 370/252; 370/204; 370/465

(58) Field of Classification Search ........... 455/450, 455/451, 452.1–2, 62, 522, 63.1–3, 67.11, 455/13, 68–69, 101–103, 132–136; 370/252, 370/345, 465, 204, 912–914; 375/222, 225, 375/377; 714/50, 51, 752
See application file for complete search history.

(56) References Cited

U.S. PATENT DOCUMENTS

| 6,167,031 A | * | 12/2000 | Olofsson et al. | 370/252 |
| 6,262,994 B1 | * | 7/2001 | Dirschedl et al. | 370/465 |
| 6,650,872 B1 | * | 11/2003 | Karlsson | 455/67.11 |
| 6,658,235 B1 | * | 12/2003 | Tolmunen et al. | 455/67.13 |
| 6,778,839 B2 | * | 8/2004 | Valkealahti | 455/522 |

* cited by examiner

*Primary Examiner*—Matthew D. Anderson
*Assistant Examiner*—Tuan Tran

(57) ABSTRACT

The invention relates to a network comprising a plurality of terminals. A transmitting terminal selects a modulation method in a first step at the beginning of a data transmission in which method a maximum permitted packet error rate for an estimated received-user-signal-to-noise-power ratio is remained under. In a second step the transmitting terminal determines the transmission power which is produced for a desired packet error rate for the modulation method selected in the first step.

12 Claims, 3 Drawing Sheets

NETWORK WITH ADAPTATION OF THE MODULATION METHOD

Figure 1:
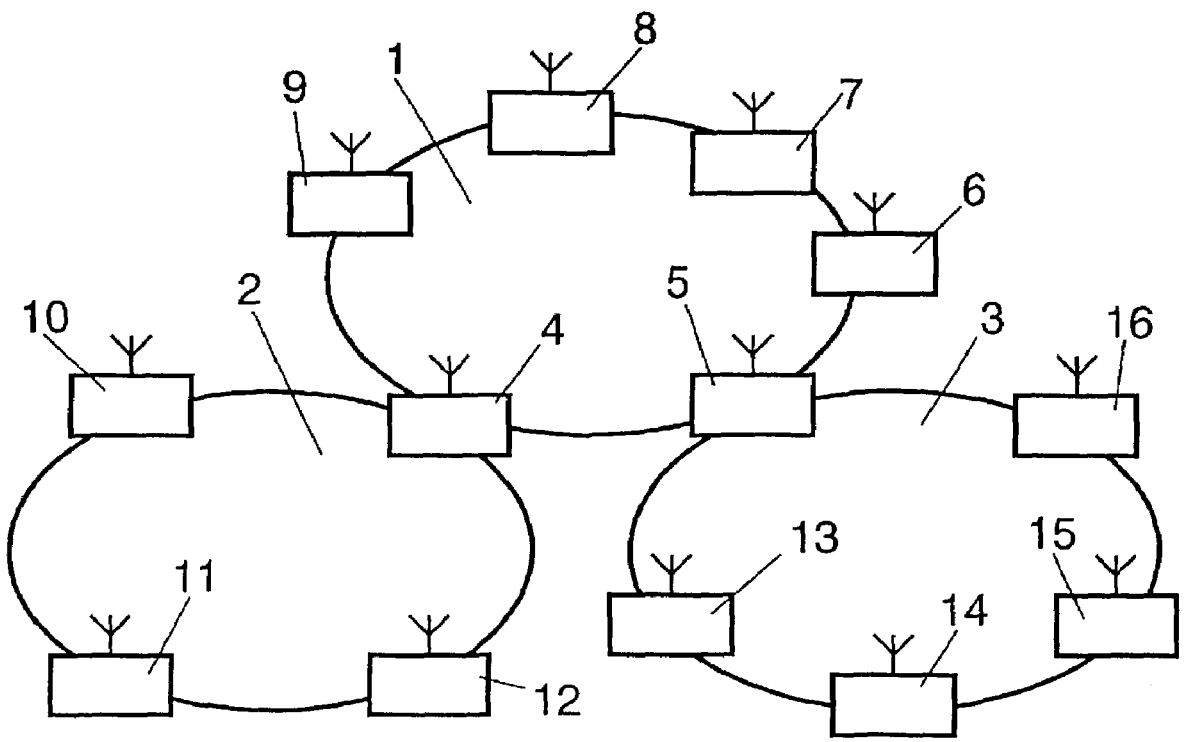

The invention relates to a network comprising a plurality of terminals which exchange messages over a wireless medium. Such a network may be an ad hoc network which is self-organizing and can comprise a plurality of sub-networks.

From the document "J. Habetha, A. Hettich, J. Peetz, Y. Du: Central Controller Handover Procedure for ETSI-BRAN HIPERLAN/2 Ad Hoc Networks and Clustering with Quality of Service Guarantees, $1^{st}$ IEEE Annual Workshop on Mobile Ad Hoc Networking & Computing, Aug. 11, 2000" is known an ad hoc network comprising a plurality of terminals. At least one terminal is provided as the controller for controlling the ad hoc network. In such a network it is desirable for the energy consumption of the terminals to be lowest possible.

Therefore, it is an object of the invention to provide a network in which the energy consumption of the terminals is reduced.

The object is achieved by a network of the type defined in the opening paragraph by the following measures:

The network comprises a plurality of terminals which are provided as a respective transmitting terminal at the beginning of data transmission
in a first step, for selecting a modulation method in which a maximum,permitted packet error rate or a maximum permitted packet delay is remained under or a maximum data throughput is achieved for an estimated received-useful-signal-to noise-power ratio and
in a second step, for determining the transmission power that is obtained for a desired packet error rate or packet delay for the modulation method selected in the first step.

The invention may be used in various mobile radio systems such as UMTS (Universal Mobile Telecommunications System), HIPERLAN/2, Bluetooth etc. The invention is highly suitable for ad hoc networks in which the communication can be effected over various radio sections. The ad hoc networks may then be either fully decentralized or subdivided into sub-networks. Within the sub-networks the terminals are not only mobile but one of the terminals operates as central controller (function of a base station). Since a modulation method is selected in a first step when a terminal sets up a connection, in which method a maximum permitted packet error rate for an estimated received-useful-signal-to-noise-power ratio is remained under, and subsequently, in a second step, the transmission power is determined which is obtained for a desired packet error rate for the modulation method selected in the first step, a quasi-optimum is determined for the transmission power. The maximum permitted packet error rate (minimum packet error rate) is then selected such that under worst case conditions a reliable data transmission is guaranteed. In contrast, the desired packet error rate (target packet error rate) depends on the type of data to be transmitted (speech, downloading of a file, Internet data etc.). As a result, a quasi-optimized energy consumption for the terminal can be achieved. The desired packet error rate may be smaller or larger than the maximum permitted packet error rate.

The desired packet error rate also depends on the requirements of the services as regards the tolerable transmission delay. This may be attributed to the fact that when an error security protocol with repeated transmission (Automatic Repeat Request (ARQ)) is used, a higher packet error rate calls forth more frequent transmission repetitions and thus a longer packet transmission period or delay respectively. As a result, instead of the packet error rate also the packet delay may be a criterion. In addition to this the data throughput may be used as a criterion.

A transmitting terminal is provided for determining the estimated received-useful-signal-to-noise-power ratio as the maximum transmission power minus estimated path losses between a transmitting terminal and a receiving terminal, and for determining a parameter. Claim 3 discusses the determination of the path losses and claim 4 the initial value of the parameter.

For determining the transmission power in the second step, a terminal stores curve values for a packet error rate in dependence on the useful-signal-to-noise-power ratio for various modulation methods.

The measures which have to be carried out in the event of changed receiving conditions are discussed in claim 6. Claim 7 describes how the parameters and the desired packet error rate are adapted.

The invention also relates to a terminal in such a network.

Figure 2:
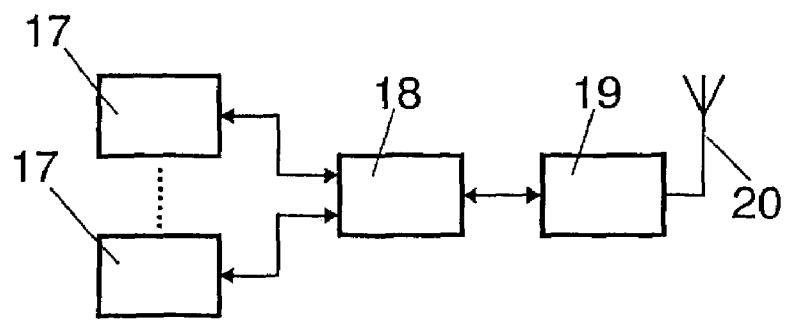
Figure 3:
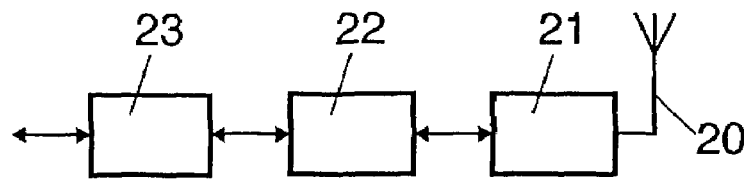
Figure 4:
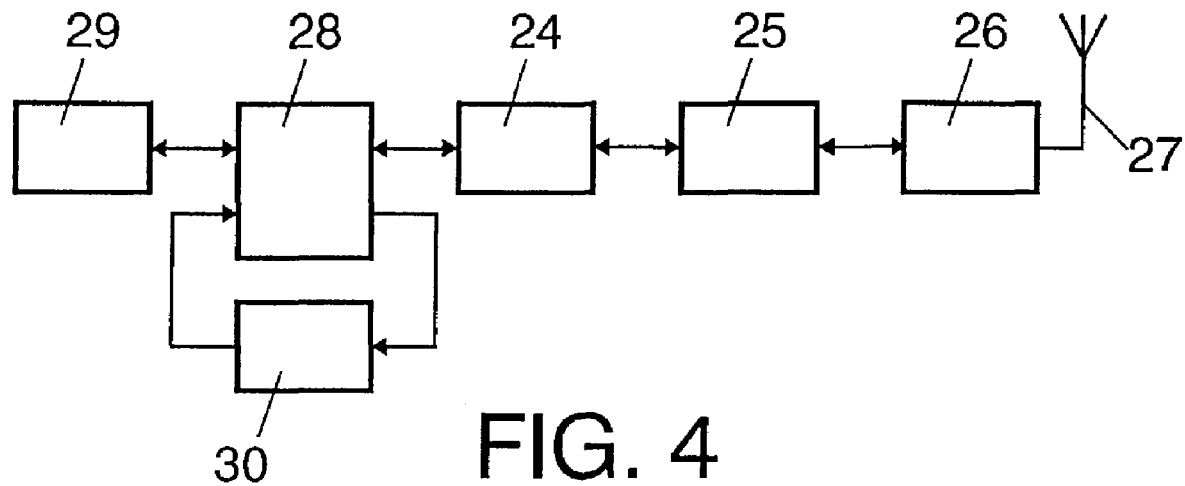
Figure 5:
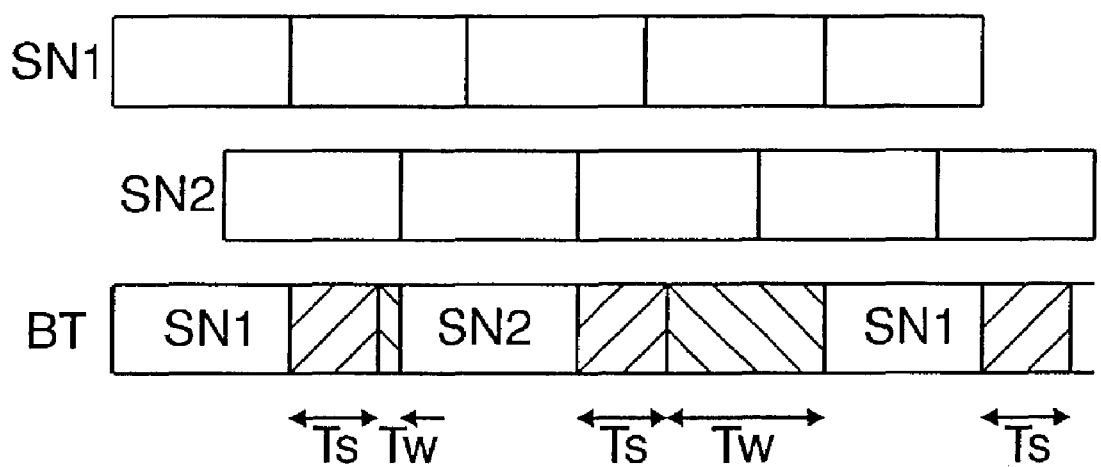
Figure 6:
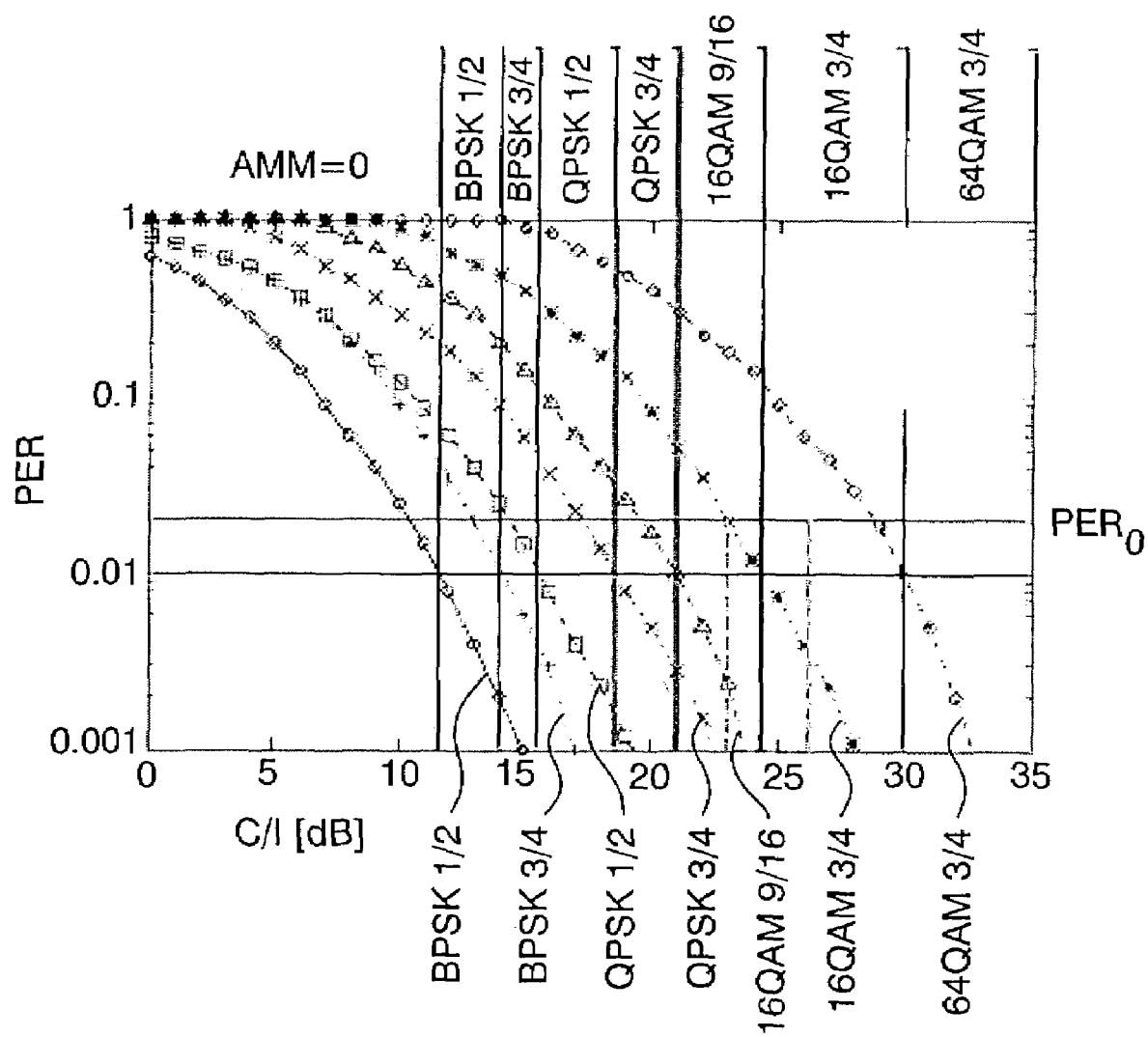

Examples of embodiment of the invention will be further explained hereinafter with reference to the drawing Figures in which:

FIG. 1 shows an ad hoc network comprising three sub-networks which comprise each terminals provided for radio transmission, FIG. 2 shows a terminal of the local-area network shown in FIG. 1, FIG. 3 shows a radio device of the terminal as shown in FIG. 2, FIG. 4 shows an embodiment of a bridge terminal for connection of two sub-networks, FIG. 5 shows MAC frames of two sub-networks and the MAC frame structure of a bridge terminal, and FIG. 6 shows a diagram with various curve patterns assigned to certain modulation methods, which patterns represent a packet error rate plotted against the received-useful-signal-to-noise-power ratio.

The example of embodiment shown in the following relates to ad hoc networks which are self-organizing which is contrary to traditional networks. Each terminal in such an ad hoc network can make access to a fixed network possible and can immediately be used. An ad hoc network is characterized in that the structure and the number of users within predefined boundary values is not fixed. For example, a communication device of a user may be removed from the network or included. Contrary to traditional mobile radio networks, an ad hoc network need not resort to a fixedly installed infrastructure.

The size of the area of the ad hoc network is usually much larger than the transmission range of a terminal. A communication between two terminals may therefore require the use of further terminals, so that they can transmit messages or data between the two communicating terminals. Such ad hoc networks in which messages and data are to be forwarded via a terminal are referred to as multihop ad hoc networks. A possible organization of an ad hoc network consists of the regular formation of sub-networks or clusters. A sub-network of the ad hoc network may be formed, for example, by terminals of users sitting around a table, which terminals are connected via radio paths. Such terminals may be, for example, communication devices for wireless exchange of documents, images and so on.

There are two types of ad hoc networks. There are decentralized and centralized ad hoc networks. In a decentralized ad hoc network the communication between the terminals is decentralized i.e. each terminal can directly communicate with any other terminal provided that the terminals are located within the transmission range of the other terminal. The advantage of a decentralized ad hoc network is its simplicity and robustness against errors. In a centralized ad hoc network certain functions such as, for example, the function of multi-access of a terminal to the radio transmission medium (Medium Access Control=MAC) is controlled by a certain terminal per sub-network. This terminal is referred to as central terminal or central controller (CC). These functions need not always be carried out by the same terminal but can be handed over from a terminal acting as central controller to another terminal then acting as central controller. The advantage of a central ad hoc network is that in this network an agreement on the quality of service (QoS) is possible in a simple way. An example for a centralized ad hoc network is a network that is organized in accordance with the HIPERLAN/2 Home Environment Extension (HEE) (compare J. Habetha, A. Hettich, J. Peetz, Y. Du, "Central Controller Handover Procedure for ETSI-BRAN HIPERLAN/2 Ad Hoc Networks and Clustering with Quality of Service Guarantees", 1$^{st}$ IEEE Annual Workshop on Mobile Ad Hoc Networking & Computing, Aug. 11, 2000).

FIG. 1 shows an example of embodiment of an ad hoc network comprising three sub-networks 1 to 3 which have each a plurality of terminals 4 to 16. The terminals 4 to 9 form part of the sub-network 1, the terminals 4 and 10 to 12 of sub-network 2 and the terminals 5 and 13 to 16 of the sub-network 3. In a sub-network the terminals belonging to it exchange data via radio paths. The ellipses shown in FIG. 1 indicate the radio area of a sub-network (1 to 3) in which a largely trouble-free radio transmission is possible between terminals belonging to the sub-network.

The terminals 4 and 5 are called bridge terminals because they enable a data exchange between two sub-networks 1 and 2 or 1 and 3, respectively. The bridge terminal 4 is responsible for the data traffic between the sub-networks 1 and 2 and the bridge terminal 5 for the data traffic between the sub-networks 1 and 3.

A terminal 4 to 16 of the local-area network shown in FIG. 1 may be a mobile or a fixed communications device and includes, for example, at least a station 17, a connection controller 18 and a radio device 19 with an antenna 20 as shown in FIG. 2. A station 17 can be, for example, a portable computer, a telephone etc.

A radio device 19 of the terminals 6 to 16 comprises, as shown in FIG. 3, in addition to the antenna 20, a high-frequency circuit 21, a modem 22 and a protocol device 23. The protocol device 23 forms packet units from the data stream received from the connection controller 18. A packet unit contains parts of the data stream and additional control information formed by the protocol device 23. The protocol device utilizes protocols for the LLC layer (LLC=Logic Link Control) and the MAC layer (MAC=Medium Access Control). The MAC layer controls the multiple access of a terminal to the radio transmission medium and the LLC layer performs a flow and error control.

As observed above, a certain terminal in a sub-network 1 to 3 of a centralized ad hoc network is responsible for the control and management functions and is referred to as central controller. The controller further works as a normal terminal in the associated sub-network. The controller is responsible, for example, for the registration of terminals which perform the operation in the sub-network, for the connection set-up between at least two terminals in the radio transmission medium, for the resource management and for the access control in the radio transmission medium. For example, a terminal of a sub-network is assigned transmission capacity for data (packet units) by the controller after the registration and after a transmission request has been announced.

In the ad hoc network the data can be exchanged between the terminals in accordance with a TDMA, FDMA or CDMA method (TDMA=Time Division Multiple Access, FDMA=Frequency Division Multiple Access, CDMA=Code Division Multiple Access). The methods may also be combined. A number of channels which are referred to as channel group are assigned to each sub-network 1 to 3 of the local-area network. A channel is determined by a frequency range, a time range and, for example, in the CDMA method by a spreading code. For example, a certain different frequency range having a carrier frequency $f_i$ can be available to each sub-network 1 to 3 for data exchange. In such a frequency range it is possible to transmit, for example, data by means of the TDMA method. The carrier frequency $f_1$ can be assigned to the sub-network 1, the carrier frequency $f_2$ to the sub-network 2 and the carrier frequency $f_3$ to the sub-network 3. The bridge terminal 4 works, on the one hand, with the carrier frequency $f_1$ for exchanging data with the other terminals of the sub-network 1 and, on the other hand, with the carrier frequency $f_2$ for exchanging data with the other terminals of the sub-network 2. The second bridge terminal 5 in the local-area network, which transmits data between the sub-networks 1 and 3, works with the carrier frequencies $f_1$ and $f_3$.

As explained above, the central controller has, for example, the function of access controller. This means that the central controller is responsible for the formation of frames of the MAC layer (MAC frames). For this purpose the TDMA method is implemented. Such an MAC frame has various channels for control information and user data.

A block diagram of an example of embodiment of a bridge terminal is shown in FIG. 4. The radio switching device of this bridge terminal includes a protocol device 24, a modem 25 and a high-frequency circuit 26 with an antenna 27. Connected to the protocol device 24 is a radio switching device 28 which is further connected to a connection controller 29 and a buffer device 30. The buffer device 30 in this embodiment includes a storage element and is used for buffering data and is realized as a FIFO component (First In First Out), i.e. the data are read from the buffer device 30 in the order in which they have been written. The terminal shown in FIG. 4 can also work as a normal terminal. Stations connected to the connection controller 29, which are not shown in FIG. 4, then deliver data to the radio switching device 28 through the connection controller 29.

The bridge terminal shown in FIG. 4 is alternately synchronized with a first and a second sub-network. Synchronization is understood to mean the whole process of including a terminal in the sub-network till the exchange of data. When the bridge terminal is synchronized with the first sub-network, it can exchange data with all the terminals and with the controller of this first sub-network. If data whose destination is a terminal or the controller of the first sub-network or a terminal or the controller of another sub-network are delivered to the radio switching device 28 by the connection controller 29, which data can be reached via the first sub-network, the radio switching device conveys these data directly to the protocol device 24. In the protocol device 24 the data are buffered until the time slot for the transmission determined by the controller has been reached. If the data delivered by the connection controller 29 are to be transmitted to a terminal or the controller of the second sub-network, or to another sub-network to be reached via the second sub-network, the radio transmission is to be delayed till the time slot in which the bridge terminal is synchronized with the second sub-network. As a result, the radio switching device conveys the data whose destination is the second sub-network, or whose destination can be reached via the second sub-network, to the buffer device 30 which buffers the data till the bridge terminal is synchronized with the second sub-network.

If data from a terminal or the controller of the first sub-network are received by the bridge terminal and their destination is the terminal or the controller of the second sub-network or a terminal or controller of another sub-network to be reached via the second sub-network, these data are also stored in the buffer device 30 till the synchronization with the second sub-network. Data whose destination is a station of the bridge terminal are directly delivered via the radio switching device 28 to the connection controller 29 which then conveys the received data to the desired station. Data whose destination is neither a station of the bridge terminal nor a terminal or controller of the second sub-network are sent, for example, to a further bridge terminal.

After the change of synchronization of the bridge terminal from the first to the second sub-network, the data situated in the buffer device 30 are again read from the buffer device 30 in the order in which they have been written. Subsequently, for the duration of the synchronization of the bridge terminal with the second sub-network, all the data whose destination is a terminal, or the controller of the second sub-network or another network to be reached via the second sub-network, are directly transferred from the radio switching device 28 to the protocol device 24 and only the data whose destination is a terminal or the controller of the first network or another sub-network to be reached via the first sub-network are stored in the buffer device 30.

The MAC frames of two sub-networks SN1 and SN2 are generally not synchronized. Therefore, a bridge terminal BT is not connected to a sub-network SN1 or SN2 not only during a change-over time Ts but also during a waiting time Tw. This can be learnt from FIG. 5 which shows a series of MAC frames of the sub-networks SN1 and SN2 and the MAC frame structure of the bridge terminal BT. The change-over time Ts is the time that is necessary for the bridge terminal to be able to synchronize with a sub-network. The waiting time Tw indicates a time between the end of the synchronization with the sub-network and the beginning of a new MAC frame of this sub-network.

Assuming that the bridge terminal BT is connected to a sub-network SN1 or SN2 only for the duration of one MAC frame, the bridge terminal BT has only a channel capacity of 1/4 of the available channel capacity of a sub-network. In the other extreme case where the bridge terminal BT is connected to a sub-network for a longer period of time, the channel capacity is half the available channel capacity of a sub-network.

As described above, each sub-network comprises a central controller for controlling the assigned sub-network. When a sub-network is taken into operation, it is to be ensured that only one terminal takes over the function of central controller. It is assumed that not every terminal can take over the function of central controller. For determining a central controller, the procedure may be that each terminal that can take over a function of controller checks whether there is another terminal in its receiver area that can carry out the function of controller. If this is the case, the detecting terminal establishes that it does not become controller. If all other terminals also carry out this check, in the end there is one terminal left that detects no other terminal with a controller function and thus takes over the function of controller.

The signals to be transmitted over radio paths in the network are first modulated according to a certain digital modulation method. Possible modulation methods are, for example, BPSK (Binary Phase Shift Keying), QPSK (Quaternary Phase Shift Keying), 16 QAM (16 Quadrature Amplitude Modulation) and 64 QAM. The signals to be modulated are coded prior to the modulation, for example, by means of a dotted convolution code. For example code rates of 3/4 or 9/16 may then be used.

When a connection between a transmitting terminal and one or more receiving terminals is set up, according to the invention, in accordance with a method to be described hereinafter and in dependence on the receiving conditions, a suitable modulation method and suitable transmission power are determined adaptively.

At the beginning of a transmission (step 1) a modulation method is determined or selected respectively, by a transmitting terminal. This is effected in that on the basis of curve values stored in a table (memory, respectively) in the transmitting terminal (compare FIG. 6) the curve values representing the packet error rate (PER) as a function of the received-user-signal-to-noise-power ratio (C/I) for various modulation methods, the modulation method is selected that with an estimated received-user-signal-to-noise-power ratio $C/I_{est}$ remains under a minimum packet error rate (maximum permitted packet error rate) of, for example, 0.01. The received-user-signal-to-noise-power ratio $C/I_{est}$ is estimated beforehand as the maximum transmission power $T_x$ minus the estimated path losses $L_p$ between a transmitting terminal and a receiving terminal and an adaptive parameter AMM (Adaptive Modulation Margin):

$$C/I_{est} = T_x - L_p - \text{AMM}$$

An initial value (of, for example, 0 dB) for the parameter AMM is adopted during connection set up. The path losses $L_p$ are determined by the exchange of power control messages between the transmitting terminal and the receiving terminal (during the connection set-up). During this process a modulation method known to both the transmitting and the receiving terminal is used as well as a specially provided channel. The power control messages are emitted with maximum transmission power, so that the path losses can be estimated by the receiving terminal on the basis of the received power.

If, for example, the estimated received-user-signal-to-noise-power ratio $C/I_{est}$ is 26.5 dB, the 16 QAM modulation method having a coding rate of 3/4 is selected in a first step shown in FIG. 6 which shows various curve values for selected modulation methods.

Subsequently, in a second step the necessary or optimum transmission power is determined. First an initial value is determined for a target packet error rate (desired packet error rate) $PER_0$. (See FIG. 6). Contrary to the fixedly predefined minimum packet error rate (or maximum permitted packet error rate) which is selected such that under worst-case conditions a reliable data transmission is guaranteed, the target packet error rate (or desired packet error rate) is dependent on the type of the data to be transmitted (speech, downloading of a file, Internet data and so on). Since the modulation method was already determined in the previous step, then, based on the curve values (FIG. 6) stored for this modulation method, the received-user-signal-to-noise-power ratio $C/I_{req}$ necessary for the target packet error rate $PER_0$ is read. The transmission power that corresponds to this received-user-signal-to-noise-power ratio $C/I_{req}$ for the target packet error rate $PER_0$ will be referred to in the following as $P_{PER0}$. The target packet error rate $P_{PER0}$ is obtained from the received-user-signal-to-noise-power ratio $C/I_{req}$ by means of the relationship $$P_{PER0}=C/I_{req}+L_p+AMM$$

The path losses $L_p$ have been estimated in the first step on the basis of the exchanged power control messages. The transmission of the data is now started with the transmission power $P=\min(P_{max}, P_{PER0})$. $P_{max}$ then represents the maximum permissible transmission power which is permitted, for example, by the authorities.

In the example for the first step the 16 QAM modulation method with a 3/4 coding rate has been selected for the estimated received-user-signal-to-noise-power ratio $C/I_{est}=26.5$ dB. The point of intersection of the curve of the 16 QAM modulation method having a 3/4 coding rate and of the target packet error rate $PER_0$ is found at the received-user-signal-to-noise-power ratio $C/I_{req}=23.5$ dB. So there is a reduction of transmission power of 3 dB at the second step compared to the first step.

During the running connection there may be variations of the path losses or received power respectively, based on variations of the receiving conditions (hindrances, weather, other statistical influences, mobility of the terminals etc.). In that case the first and second steps are passed through again in the third step while the two parameters AMM and $PER_0$ are then not initialized again, but the previous values are retained. Alternatively, the third step may be used periodic distances apart.

The two parameters AMM and $PER_0$ may further be adaptively changed in a further, fourth step. For this purpose the parameters AMM and $PER_0$ are periodically adapted based on power parameters of the operation of the system. The following magnitudes: "percentage of successful attempts at connection set-up", "reciprocal of the average packet error rate in the network", "reciprocal of the average packet delay in the network", "throughput of the overall system", "reciprocal of the number of connections broken off" may alternatively or in combination also be used as power parameters. This adaptation may be effected in the same or larger time distances than the adaptation according to the third step. The following regulation is used for changing the two parameters AMM and $PER_0$, where $LK_i$ denotes the value of a power parameter in a certain time slot (or period) $t_i$ with $i=0, 1, 2, \ldots$ First the parameter AMM is adapted:
IF $LK_i \geq LK_{i-1}$ AND in the end was increased by to $t_{i-1}$ AMM THEN AMM is increased by 1 dB;
IF $LK_i \geq LK_{i-1}$ AND in the end was reduced by $t_{i-1}$ AMM THEN AMM is reduced by 1 dB;
IF $LK_i < LK_{i-1}$ AND in the end was increased by $t_{i-1}$ AMM THEN AMM is reduced by 1 dB;
If $LK_i < LK_{i-1}$ AND in the end was increased by $t_{i-1}$ AMM THEN AMM is increased by 1 dB.

Subsequently, there is an adaptation of the parameter $PER_0$ (for example based on the power parameter "average packet error rate in the overall network" $PER_{av}$):
IF $PER_{av,i} < PER_{av,i-1}$, THEN $PER_0$ is divided by 0.9
IF $PER_{av,i} > PER_{av,i-1}$ THEN $PER_0$ is multiplied by 0.9.

Instead of the described simple regulation it is also possible for higher-order regulations or regulation techniques such as the Kalman filter of fuzzy regulators to be used.

The regulation in the above example is effected in that the two parameters are re-adjusted independently of each other. However, also subordinate regulations are conceivable. This means that not first the parameter AMM and then the parameter $PER_0$ is set, but that the parameter AMM and the parameter $PER_0$ are increased together.

As an alternative for the packet error rate PER, also the stored curve values can represent the dependence of the average packet delay or of the throughput on the received-user-signal-to-noise-power ratio (C/I). First the use of the packet delay and then the use of the throughput is described.

When the average packet delay is used in dependence on the received-user-signal-to-noise-power ratio (C/I) for various modulation methods, the modulation method that remains under a fixed minimum delay for an estimated received-user-signal-to-noise-power ratio ($C/I_{est}$) is selected. The estimated received-user-signal-to-noise-power ratio ($C/I_{est}$) is determined as described above, with also the parameter AMM being used.

Subsequently, in a second step the necessary or optimum transmission power respectively is determined. First an initial value for an average target delay (desired packet delay) $T_0$ is determined which depends on the type of data to be transmitted (speech, downloading of a file, Internet data and so on). Since the modulation method was already determined in the previous step, the received-user-signal-to-noise-power ratio $C/I_{req}$ necessary for the target delay $T_0$ is then read out based on the curve values stored for this modulation method.

The two parameters AMM and $PT_0$ are optimized based on power parameters during the operation of the network just like the packet error rate PER is used. The adaptation of the parameter AMM is identical to the procedure described above. Subsequently, the parameter To is adapted (for example on the basis of the power parameter "average packet delay in the overall network" $T_{av}$):
IF $T_{av,i} < T_{av,i-1}$, THEN $T_0$ is divided by 0.9,
IF $T_{av,i} > T_{av,i-1}$ THEN $T_0$ is multiplied by 0.9.

Arbitrary power parameters can be used for this process (for example the average packet error rate in the whole network can be selected for the adaptation of the parameter $T_0$ just like for the adaptation of the parameter $PER_0$.

When the throughput instead of the packet error rate is used for various modulation methods, the very modulation method is selected that provides the maximum throughput with an estimated received-user-signal-to-noise-power ratio $C/I_{est}$ in dependence on the received-user-signal-to-noise-power ratio (C/I). The estimated received-user-signal-to-noise-power ratio $C/I_{est}$ is determined as described before while also the parameter AMM is being used.

Subsequently, in a second step the necessary or optimum transmission power is determined. Determining the optimum transmission power with a modulation method that has already been selected is effected with one of the two methods described before either on the basis of the packet error rate (and the parameter $PER_0$), or on the basis of the average packet delay (and the parameter $T_0$).

The parameters AMM and $PER_0$ or $T_0$, respectively, are optimized as described above, on the basis of power parameters while the network is in operation.

The invention claimed is:
1. A method for selecting a modulation at the beginning of a data transmission in a network comprising a plurality of terminals, the method comprising the steps of:
 selecting a modulation method in which a maximum permitted packet error rate or a maximum permitted packet delay or a maximum data throughput is achieved for an estimated received-user-signal-to-noise-power ratio; and determining a transmission power for a desired packet error rate or packet delay for the modulation method selected, the desired error rate or packet delay being dependent on the type of data to be transmitted, as an estimated received-user-signal-to-noise-power ratio being a maximum transmission power minus estimated path losses between a transmitting terminal and a receiving terminal and a parameter, the parameter and the desired packet error rate or packet delay being incrementally adapted by a factor of a predetermined value based on power parameters at certain distances.

2. The method as claimed in claim 1, further comprising the steps of:
exchanging power control messages with a receiving terminal; and
determining the path losses based on the power control messages returned to the receiving terminal.

3. The method as claimed in claim 1, further comprising the step of:
setting the parameter to zero when a connection is set up.

4. The method as claimed in claim 1, further comprising the step of:
storing various modulation methods curve values for a packet error rate, a packet delay or a data throughput in dependence on the user-signal-to-noise-power ratio.

5. The method as claimed in claim 1, wherein steps of determining a modulation method and a transmission power are based on either a change in receiving conditions or on a periodic basis.

6. The method as recited in claim 1, wherein the transmitted power is incrementally increased after a previous power increase or incrementally decreased after a previous power decrease.

7. The method as recited in claim 6, wherein the factor has a value substantially equal to 1dB.

8. The method as recited in claim 1, wherein the desired packet error rate is incrementally increased if an average packet error rate is less than a previous error rate or incrementally decreased if an average packet error rate is greater than a previous error rate.

9. The method as recited in claim 8, wherein the factor has a value substantially equal to 0.9

10. The method as recited in claim 1, wherein the desired packet delay is incrementally increased if an average packet delay is less than a packet delay or incrementally decreased if an average packet delay is greater than a packet delay.

11. The method as recited in claim 10, wherein the factor has a value substantially equal to 0.9.

12. A terminal in a network comprising a plurality of further terminals, operable as a transmitting terminal, which at the beginning of a data transmission;
selects a modulation method in which a maximum permitted packet error rate or a maximum permitted packet delay or a maximum data throughput is achieved for an estimated received-useful-signal-to noise-power ratio; and
determines a transmission power for a desired packet error rate or packet delay for the modulation method selected, the desired error rate or packet delay being dependent on the type of data to be transmitted, as an estimated received-user-signal-to-noise-power ratio being a maximum transmission power minus estimated path losses between a transmitting terminal and a receiving terminal and a parameter, the parameter and the desired packet error rate or packet delay being incrementally adapted by a factor of a predetermined value based on power parameters at certain distances.

* * * * *